US005965953A

United States Patent [19]

Ikeda et al.

[11] Patent Number: 5,965,953

[45] Date of Patent: Oct. 12, 1999

[54] SUPERLOCKING VEHICLE DOOR LOCK/UNLOCK SYSTEM

[75] Inventors: Toshifumi Ikeda; Hitoshi Nakashima; Minoru Ueda, all of Hiroshima, Japan

[73] Assignee: Mazada Motor Corporation, Hiroshima, Japan

[21] Appl. No.: 08/938,626

[22] Filed: Sep. 26, 1997

[30] Foreign Application Priority Data

Sep. 27, 1996 [JP] Japan .................................... 8-255926

[51] Int. Cl.$^{6}$ ............................ B60R 25/00; E05B 53/00

[52] U.S. Cl. ............................ 307/10.2; 70/264; 180/287

[58] Field of Search .................................. 307/10.1–10.6; 70/264, 237; 180/287; 340/425.5, 426, 825.3–825.32, 825.69, 825.72

[56] References Cited

U.S. PATENT DOCUMENTS 5,621,251 4/1997 Yamazaki ................................ 307/10.2

5,638,712 6/1997 Kuroda ...................................... 70/264

FOREIGN PATENT DOCUMENTS 63-326340 12/1988 Japan .

2171485 7/1990 Japan .

7-26821 1/1995 Japan .

*Primary Examiner*—Richard T. Elms

*Attorney, Agent, or Firm*—Sixeby, Friedman, Leedom & Ferguson, P.C.; Donald R. Studebaker

[57] ABSTRACT

A door lock/unlock system of a type having an electrically operated door lock/unlock mechanism for holding a door in a locked position and allowing the door to be opened comprises a position sensor for detecting positions of the door lock/unlock mechanism, namely a lock position and an unlock position, when a battery is removed from an electric circuit once and thereafter re-connected again to the same, with or without an intention of committing a theft of the vehicle, and a controller for controlling operation of the door lock/unlock mechanism according to the detected position.

7 Claims, 7 Drawing Sheets

SUPERLOCKING VEHICLE DOOR LOCK/ UNLOCK SYSTEM

BACKGROUND OF THE INVENTION

1. Field of the Invention

This invention relates to a door lock/unlock system for a vehicle, and, more particularly, to a door lock/unlock system provided with an antitheft feature.

2. Description of Related Art

In recent years, vehicles are typically equipped with a door lock/unlock system having a power lock feature that a door lock/unlock mechanism is actuated by an electric actuator to lock and unlock a vehicle door. With such a door lock/unlock system, when manually locking or unlocking a door beside a driver's seat, other doors are correspondingly locked or unlocked by means of an electric actuator all at once. Even when the lock/unlock mechanism is in a lock state or in an unlock state, each of the doors is unlocked by manually operating a related interior door lock knob. Accordingly, it is possible for burglars or persons other than the owner of the vehicle to unlock a door in an unfair manner, for example by breaking a window glass and operating the interior door lock knob with a hand or by operating the interior door lock knob with a metal wire or a metal stick inserted through a gap between a window frame and a window glass. In order to prevent a vehicle from robbery or theft, there have been proposed restraint door lock system of the type equipped with a power lock mechanism and a restraint door lock mechanism which makes the door lock/unlock mechanism inoperative unless the door key inserted in the key cylinder is operated with intention of opening the door and even, for example, when the interior door lock knob is operated to unlock the door. Such a restraint door lock system is known from, for example, Japanese Patent Application laid-open to the public as Publication No. 2-171485.

It is noted that the term "super lock" as used hereafter in the specification refers to a state that the lock/unlock mechanism is restrained in the lock state and abbreviated "S/L," the term "normal lock" as used hereafter in the specification refers to a state that the lock/unlock mechanism is in an ordinary lock state and abbreviated "N/L," and the term "unlock lock" as used hereafter in the specification refers to a state that the lock/unlock mechanism is in an unlock state and abbreviated "U/L."

Because the super lock system, i.e. the restraint door lock system, is actuated by a power actuator, in the event that persons having an intention of committing a theft of the vehicle cuts off the electric connection between the power source battery and the electric circuit of the vehicle after breaking a window and operating a hood opener to open the hood of the engine compartment, and electrically connects these power source battery and electric circuit of the vehicle again, the power actuator recovers its operation and, however, brings the restraint door lock mechanism into release of the super lock state.

In order to be prevented from a theft, a vehicle of this type is provided with a hood opener lock means for locking a hood opener to prevent the hood of an engine compartment from being opened whenever the door lock/unlock mechanism is in the super lock state, so as thereby to deprive a person having an intention to steal the vehicle of access to the power source battery in the engine compartment. Such a hood opener lock means is known from, for example, Japanese Patent Application laid-open to the public as Publication No. No.7-26821. There has been proposed a door lock/unlock mechanism adapted to restraint release of the super lock state when re-connected to the power source battery.

While the door lock/unlock system adapted to restraint release of the super lock state when re-connected to the power source battery is desirable in light of the antitheft purpose, however, it causes a somewhat troublesome operation imposed on a driver. Specifically, in an event where, after having removed once a battery from the vehicle with the door lock/unlock mechanism of all of the door left in the super lock state, for the purpose of, for example, charging the battery or replacing the battery with a fresh one, the charged battery or a fresh battery is re-connected to the electric circuit of the vehicle with only the driver's side door having been unlocked by a door key, the remaining doors other than the driver's side door remain in the super lock state. Consequently, it is necessary for the driver to release the super lock state of the door lock/unlock mechanisms of the remaining doors before unlocking the remaining doors, which is always troublesome for the driver.

SUMMARY OF THE INVENTION

It is accordingly an object of the invention to provide a door lock/unlock system which provides a high antitheft quality and high serviceability.

The foregoing object of the invention is accomplished by providing a door lock/unlock system of a type having an electrically operated door lock/unlock mechanism and an actuation means for electrically actuating the door lock/ unlock mechanism to shift to a lock state to lock a door of a vehicle or an unlock state to unlock the door in response to operation of a door key. The door lock/unlock system comprises a position detection means to detect operated positions of the door lock/unlock mechanism when a power source battery is brought into connection to an electric circuit for operating electric components of the vehicle including these actuation means and door lock/unlock mechanism, a control means for controlling operation of the actuation mechanism according the operated positions of the door lock/unlock mechanism detected by the position detection means, and a restraint means, which is electrically actuated in response to specific operation, for example a specified number of times of locking operation, of the door key within a specified period of time, is further provided to bring the door lock/unlock mechanism into a restraint lock state where the door lock/unlock mechanism is forced to remain in the lock state. When the power source battery is re-connected to the electric circuit, the control means provides a restraint signal with which the restraint means is electrically actuated to force the door lock/unlock mechanism to remain in the restraint lock state when the position detection means detects the door lock/unlock mechanism in the lock position or an unlock signal with which the actuator means causes the door lock/unlock mechanism to shift to the unlock position when the position detection means detects the door lock/unlock mechanism in the unlock position.

The control means controls operation of the actuation mechanism for each of a plurality of doors according to the operated positions of the door lock/unlock mechanism of a specified one of the doors, preferably the driver's side door, detected by the position detection means.

The position detection means comprises a switch turning on and off according to positions of a lock link means forming part of the door lock/unlock mechanism which moves between two positions corresponding to the lock and unlock positions of the door lock/unlock mechanism, or otherwise may comprise a position sensor for detecting positions of an interior door lock knob linked to the actuation mechanism.

With the door lock/unlock system of the invention in which the actuation means is controlled according to lock states of the door before the re-connection of the battery to the control circuit, whenever a battery is disconnected from the control circuit of the vehicle and reconnected to the same, with or without an intention of committing a theft of the vehicle, the door lock/unlock system is properly restored to the state before removal of the battery. In particular, since the door lock/unlock system is left in the super lock state, the door is left locked even when a battery is removed or disconnected once from the electric circuit and reconnected to the same again with an intention of committing a theft of the vehicle, the vehicle is provided with a high antitheft quality.

Furthermore, since all of the doors take their lock or unlock state following the driver's side door, in other words all of the doors are consistent with each other in lock condition, whenever a battery is reconnected, the door lock/unlock system has an highly improved serviceability. For example, even when a battery is removed or disconnected from the electric circuit of the vehicle with the driver's side door unlocked and the remaining door remaining super locked, all of the doors are unlocked when an battery is reconnected to the electric circuit.

With the door lock/unlock system having, as position detection means, a switch turning on and off according to positions of a lock link means forming part of the door lock/unlock mechanism or a position sensor for detecting positions of the interior door lock knob for the driver's side door, even though the door lock/unlock mechanism is of the type provided with a disconnecting mechanism for breaking off coordinated movement between the lock link lever means and the interior door lock knob when it is in the super lock state or of the type provided with a mechanism to fix the interior door lock knob when it is in the super lock state, the lock state of the door is easily detected.

BRIEF DESCRIPTION OF THE DRAWINGS

The above and other objects and features of the present invention will be understood from the following description of a specific embodiment thereof when considering in conjunction with the accompanying drawings, in which.

DETAILED DESCRIPTION OF THE SPECIFIC EMBODIMENT

Figure 1:
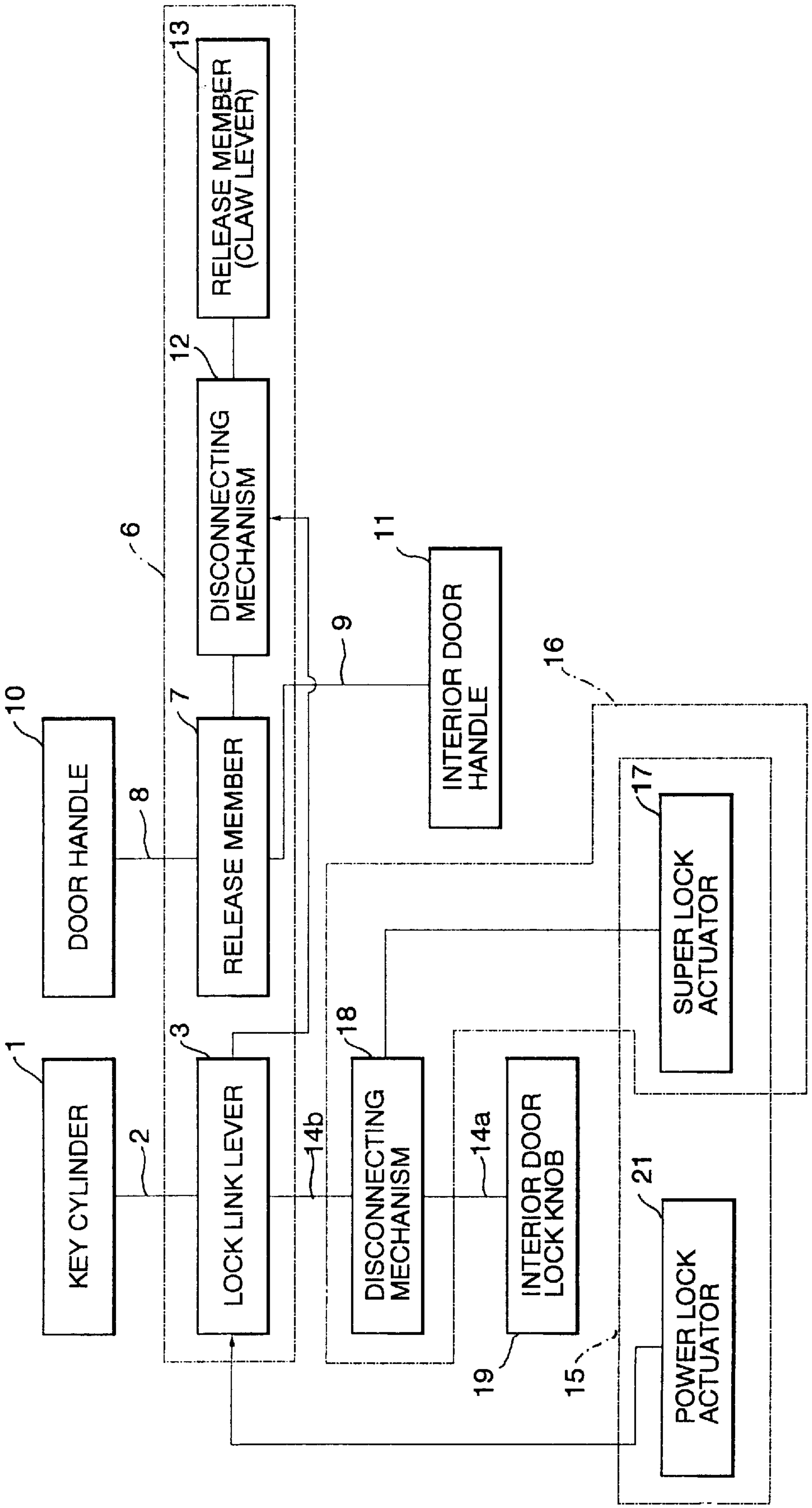
FIG. 1 is a functional block diagram conceptually showing a door lock/unlock system of the invention.
Figure 2:
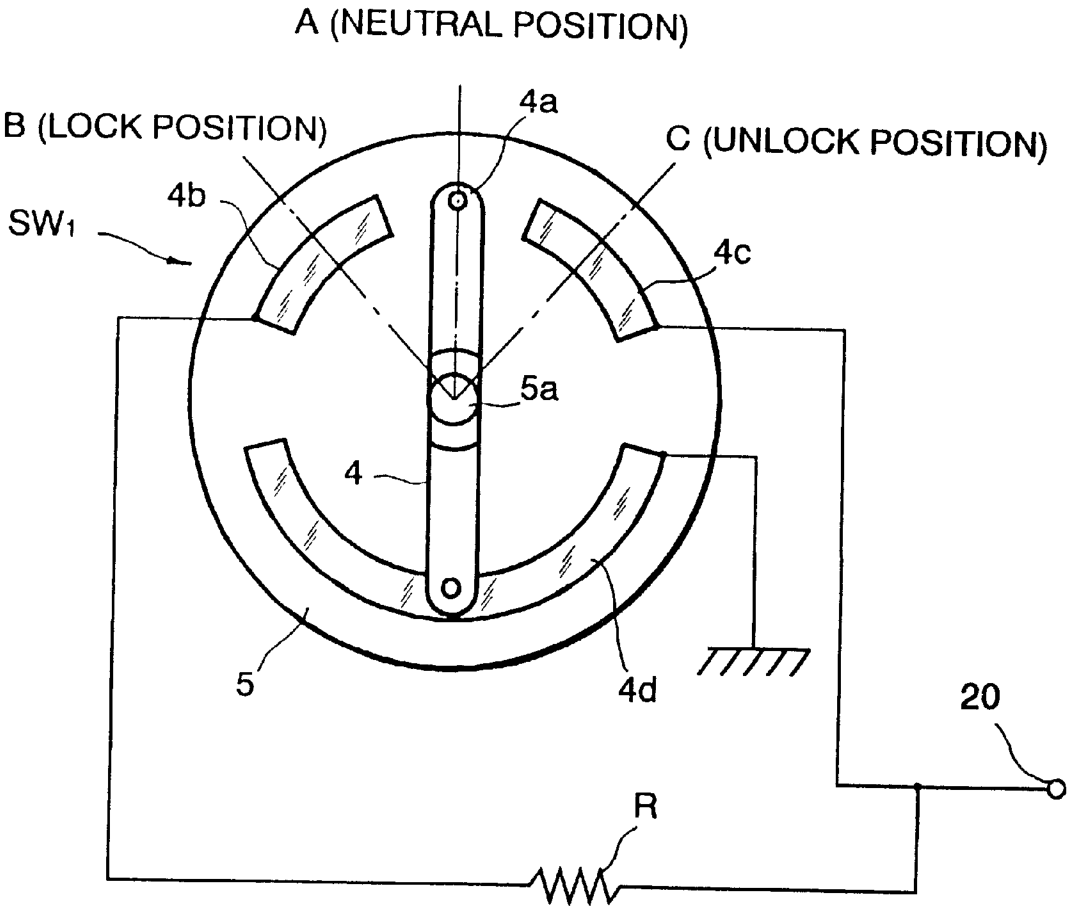
FIG. 2 is a plan view of a key cylinder switch and its associated parts installed to a key cylinder.
Figure 3:
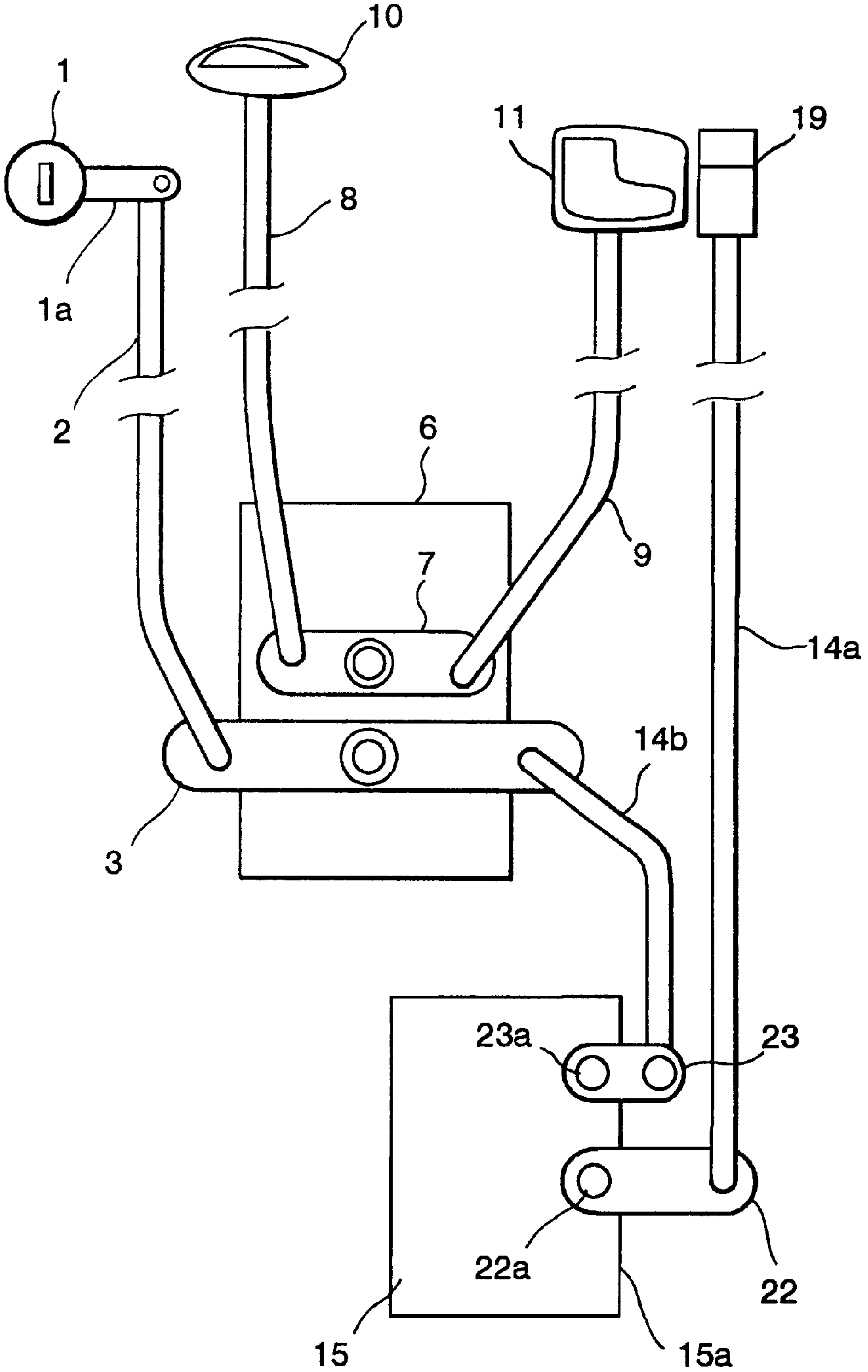
FIG. 3 is a schematic illustration showing a door lock/unlock mechanism of the door lock/unlock system.

Referring to the drawings in detail, particularly to FIGS. 1 to 3 which show the structure of a door lock/unlock system according to an embodiment of the invention, the door lock/unlock system includes a key cylinder 1 for a door beside the driver's seat (not shown), to which a key cylinder switch SW1 such as shown in FIG. 2 is installed. The key cylinder switch SW1 has a slide contact 4*a* which in turn rotates together with the key cylinder 1. The key cylinder 1 is rotated by a door key (not shown) to move the slide contact 4*a* of the key cylinder switch SW1 to a lock position B or an unlock position C from a neutral position A. As shown in detail in FIG. 3, the key cylinder 1 is linked with a larch mechanism 6 through an arm 1*a* and a linking rod 2 so as to turn a lock link lever 3 to a lock position following a turn to the lock position B thereof and to an unlock position following a turn to the unlock position C thereof.

As shown in FIG. 2, the key cylinder switch SW1 has a base support 5 formed with stationary circular-arcuate contact segments 4*b*, 4*c* and 4*d* and a slide contact arm 4 provided with slide contacts 4*a* at both ends which is mounted for rotation together with the key cylinder by a shaft 5*a* secured to the base support 5. The stationary contact segments 4*b*, 4*c* and 4*d* are arranged in a circular path of the slide contact arm 4 so that the stationary contact segment 4*d* remains contacted by one of the slide contacts 4*a* even during movement of the other slide contact 4*a* between the stationary contact segments 4*b* and 4*c* located at the lock and unlock positions B and C, respectively. As will be described with reference to FIG. 4 later, the stationary contact segment 4*b* is connected to one of input terminal 20 of a lock/unlock control circuit formed on a circuit board 30 through a resistance R, and the stationary contact segment 4*c* is directly connected to the input terminals 20. On the other hand, the stationary contact segment 4*d* is directly grounded. The key cylinder switch SW1 provides a first specific voltage as a lock signal when placing the slide contact arm 4 in the lock position B to ground the stationary contact segment 4*b* through the resistance R and a second specific voltage as an unlock signal when placing the slide contact arm 4 in the lock position B to ground the stationary contact segment 4 directly.

As shown in FIG. 3 in detail, the door lock/unlock mechanism, which may be of the type well known in structure and operation in the art, is provided with the larch mechanism 6 of has the lock link lever 3 and an unlock link lever 7 mounted for rotation on shafts 6*a* and 6*b*, respectively. The unlock link lever 7 at its opposite ends is linked with an outside door handle 10 and an interior door handle 11 through linking rods 8 and 9, respectively. Further, the unlock link lever 7 is linked with a release member (claw lever) 13 through a disconnecting mechanism 12 (schematically shown in FIG. 1) which is incorporated in the latch mechanism 6 to break off coordinated movement of these unlock link lever 7 and release member 13 when the lock link lever 3 is turned by the key cylinder 1 operated to the lock position B so as to cause the outside door handle 10 and the interior door handle 11 to result in as an unavailing unlock action. The door lock/unlock system includes an actuator unit 15 comprising a super lock actuator 17 forming a part of a super lock unit 16 and a power lock actuator 21 (shown in FIG. 1). This power lock actuator 21 is installed to the door beside the driver's seat only and causes the door lock/unlock mechanisms to lock doors all at once when actuated through operation of the key cylinder 1 to the lock position B. These actuators 17 and 21 may be operated by a motor commonly or motors separately.

As shown in FIG. 3, this actuator unit 15 is provided with levers 22 and 23. The lever 22 is secured at one of its ends to a shaft 22*a* supported for rotation by a housing 15*a* of the actuator unit 15 and linked at another end with an interior door lock knob 19 through a linking rod 14*a*, and the lever 23 is secured at one of its ends to a shaft 23*a* supported for rotation by the housing 15*a* of the actuator unit 15 and linked at another end with the lock link lever 3 through a linking rod 14*b*. The super lock unit 16 comprises the super lock actuator 17 and a disconnecting mechanism 18 (schematically shown in FIG. 1) which is interposed between the shafts 22*a* and 22*b* of the levers 22 and 23 to break off coordinated movement of the lock link lever 3 and the interior door lock knob 19, i.e. linkage between these lock link lever 3 and interior door lock knob 19 through the linking rod 14*a*, the levers 22 and 23, and the linking rod 14*b*, when the super lock actuator 17 is activated so as to cause the interior door lock knob 19 to result in as an unavailing unlock action. For detailed description of a representative example of such a super lock unit 16 including the super lock actuator 17, the disconnecting mechanism 18 and their associated mechanisms, reference may be had to, for example, Japanese Patent Application laid-open to the public as Publication No. 62-199555.

The door lock system includes various switches in addition tho the key cylinder switch SW1, namely lock link lever switch SW2, a motor control switches SW3, an ignition key switch SW4, a key-less door lock switch SW5, and a door switch SW6 (see FIG. 4) which will be described later.

Figure 4:
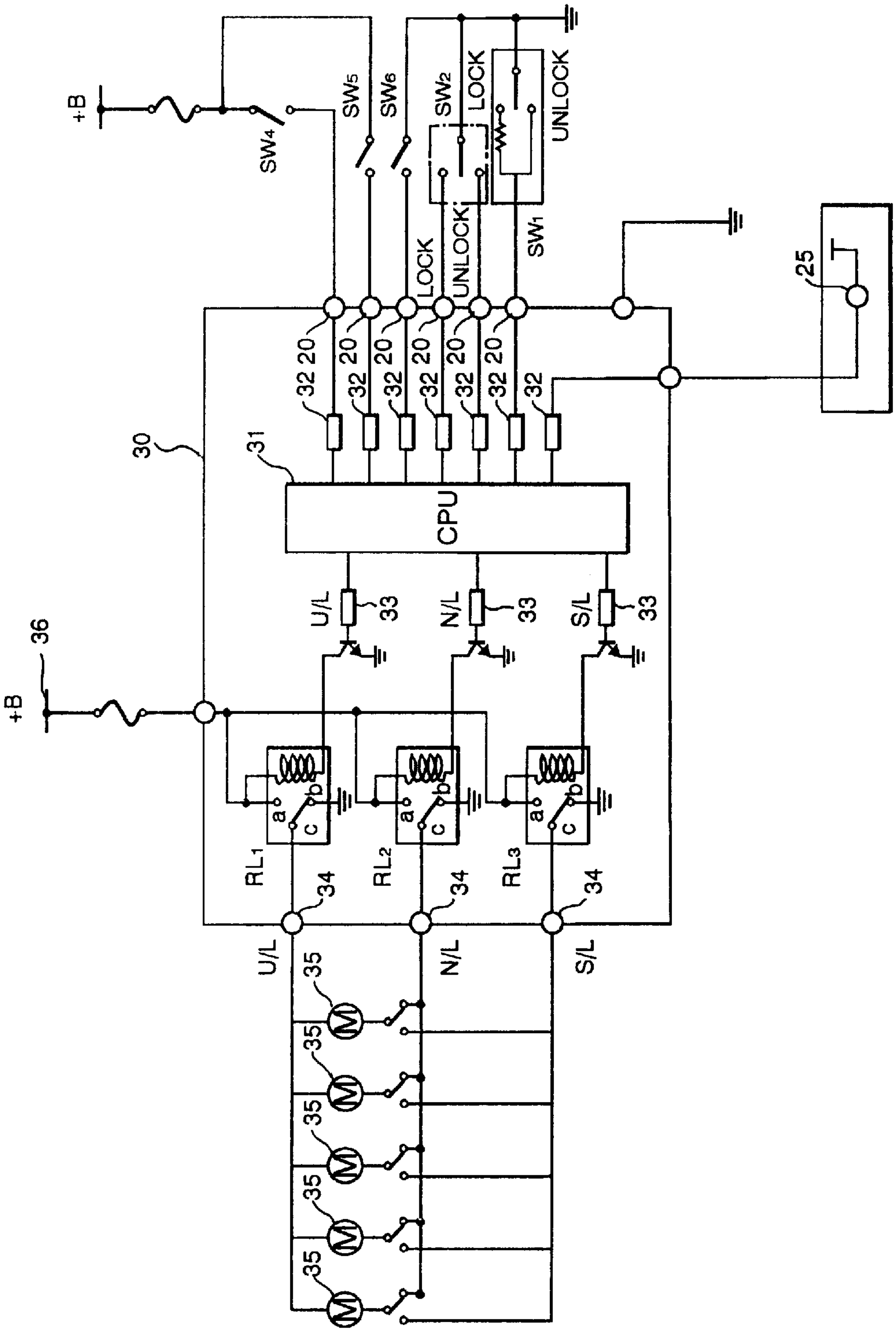
FIG. 4 is a circuit diagram of a door lock/unlock system according to an embodiment of the invention.

FIG. 4 shows a door lock/unlock control circuit formed on a circuit board 30 which is in the unlock state. A microcomputer 31 has a plurality of input ports 32 through which signals are input from the switches SW1, SW2, and SW4–SW6 connected to the input terminals 20, respectively. The lock link lever switch SW2 and the motor control switches SW3 are incorporated in the actuator unit 15. The lock link lever switch SW2 cooperates with the lock link lever 3 to detect lock and unlock positions of the lock link lever 3. The motor control switches SW3 change drive circuits for actuator drive motors 35 in response to operation of the actuator 17. The microcomputer 31 also has a plurality of output ports 33 through which command signals, such as an unlock command signal (U/L), an ordinary lock command signal (N/L) and a super lock command signal (S/L), are output to energize relays RL1–RL3, respectively. Each relay RL1, RL2, RL3 has three contacts, namely a stationary contact a connected to a power source battery 35 of a potential of 12 volts, a stationary contact b grounded, and a movable contact c connected to an output terminal 34 which remains contacted with the grounded stationary contact b when the relay RL1, RL2, RL3 is in its normal state and is brought into contact with the stationary contact a when the relay RL1, RL1, RL3 is energized. Each motor control switch SW3 has movable contact c, connected to the actuator drive motor 35, which is brought into contact with a stationary contact a connected to the output terminal 34 of the relay RL2 in the unlock state or with a stationary contact b connected to the output terminal 34 of the relay RL3 in the super lock state. Each actuator drive motor 35 is connected to the output terminal 34 of the relay RL1.

In the door lock/unlock control circuit, when the key cylinder 1 is operated by the key to turn to the lock position B from the neutral position A, the microcomputer 31 provides an ordinary lock command signal (N/L) in response to reception of a lock signal from the key cylinder switch SW3, with which the relay RL2 is energized to apply a voltage to its output terminal 34. In the event where the key cylinder 1 is repeatedly operated to the lock position B consecutively two times within a predetermined period of time, which is relatively short and for example 3 seconds, the microcomputer 31 provides a super lock command signal (S/L) in response to reception of two lock signals from the key cylinder switch SW1. The super lock command signal (S/L) energizes the relay RL3 to apply a voltage to its output terminal 34. Further, when the key cylinder 1 is operated by the key to turn to the unlock position C from the neutral position A, the microcomputer 31 provides an unlock command signal (U/L) in response to reception of an unlock signal from the key cylinder switch SW1, with which the relay RL1 is energized to apply a voltage to its output terminal 34.

The following description will be directed to switching operation of the motor control switch SW3 from one operative state to another.

In the unlock state shown in FIG. 4, when the relay RL2 is energized with an ordinary lock command signal (N/L) provided from the microcomputer 31, an electric current flows to the ground through the output terminal 34 of the relay RL2, the stationary contact a connected to the output terminal 34, the actuator drive motor 35, and the output terminal 34 and the stationary contact b of the relay RL1 for a predetermined period of time, which is relatively short. As a result, the actuator drive motor 34 rotates in a normal direction for the predetermined period of time, actuating the power lock actuators 21 so as thereby to cause the door lock/unlock mechanisms to lock the doors all at once. After the predetermined period of time, the relay RL2 is deenergized to cause the motor control switch SW3 to bring its movable contact c into contact with the stationary contact b.

While the door lock/unlock control circuit is in the ordinary lock state, when the microcomputer 31 provides a ordinary lock command signal (N/L) to energize the relay RL3, an electric current flows to the ground through the output terminal 34 of the relay RL3, the stationary contact b of the motor control switch SW3 connected to the output terminal 34, the actuator drive motor 35, and the output terminal 34 and the stationary contact b of the relay RL1 for a predetermined period of time. As a result, the actuator drive motor 34 further rotates in the normal direction for the predetermined period of time, actuating the super lock actuator 17 so as thereby to cause the disconnecting mechanism 18 to bring the door lock/unlock mechanisms into the super lock state. At this time, the microcomputer 31 provides a signal to activate an indicator 25 for a predetermined period of time. On the other hand, while the door lock/unlock control circuit is in the ordinary lock state, when the microcomputer 31 provides an unlock command signal (U/L) to energize the relay RL1, an electric current flows to the ground through the output terminal 34 of the relay RL1, the actuator drive motor 35, the stationary contact b of the motor control switch SW3, the output terminal 34, and the stationary contact b of the relay RL3 for a predetermined period of time, which is relatively short. As a result, the actuator drive motor 34 rotates in the reverse direction for the predetermined period of time, actuating the power lock actuator 21 so as thereby to cause the door lock/unlock mechanisms to unlock the doors all at once. After the predetermined period of time, the motor control switch SW3 brings its movable contact c into contact with the stationary contact a.

While the door lock/unlock control circuit is in the super lock state, when the microcomputer 31 provides an unlock command signal (U/L) to energize the relay RL1, an electric current flows to the ground through the output terminal 34 of the relay RL1, the actuator drive motor 35, the stationary contact b of the motor control switch SW3 connected to the output terminal 34, and the stationary contact b of the relay RL3 for a predetermined period of time, which is long, causing the actuator drive motor 34 to rotate in the reverse direction for the predetermined period of time. As a result, the super lock actuator 17 is actuated so as to make the disconnecting mechanism 18 remain inoperative. At this time, the power lock actuator 21 is operated to cause the lock/unlock mechanism to unlock the doors all at once. Following unlocking all of the doors are unlocked, the motor control switch SW3 brings its movable contact c into contact with the stationary contact a.

Figure 5:
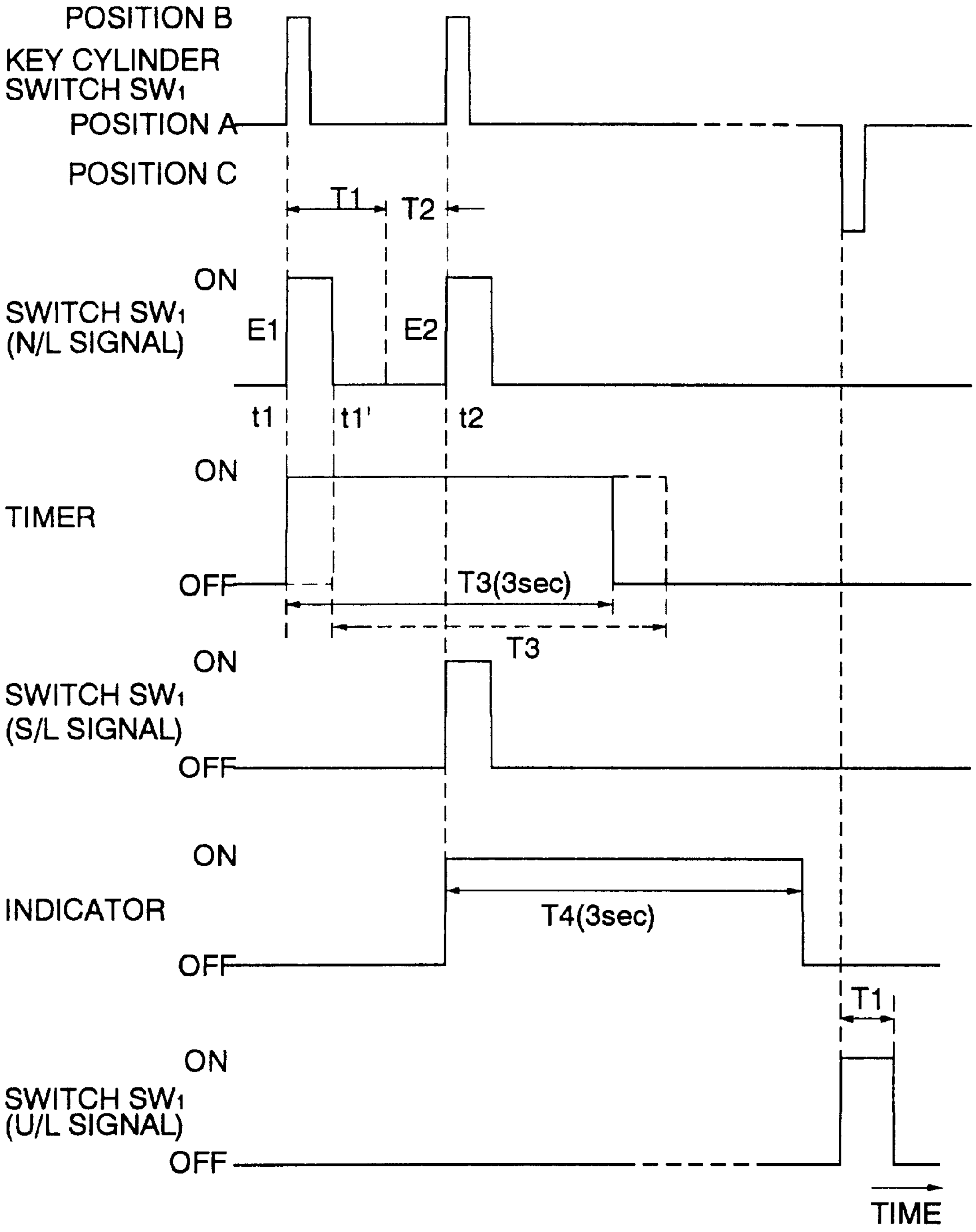
FIG. 5 is a time chart of sequential operation of the door lock/unlock system

FIG. 5 shows the timed-sequence operation taking place when the door lock/unlock system shifts to the ordinary lock state or the super lock state from the unlock state.

When the key cylinder 1 is operated to cause the key cylinder switch SW1 to take the lock position B at a point of time t1, the key cylinder switch SW1 provides an ordinary lock signal in the form of a pulse having a specified pulse width or pulse duration T1. While the power lock actuator 21 is actuated with the ordinary lock pulse signal to create the ordinary lock position in the door lock/unlock system, a count down timer sets an initial time T3 of, for example 3 seconds, in response to rising, i.e. the leading end, of the pulse duration E1, of the ordinary lock pulse signal. When the key cylinder 1 is operated once again to cause the key cylinder switch SW1 to take the lock position B and provide another ordinary lock pulse signal having the pulse duration T1 at a point of time t2 before the timer has counted down the initial time T3, the microcomputer 31 provides a super lock command signal (S/L) to actuate the super lock actuator 17, bringing the door lock/unlock system into the super lock state. Simultaneously, the microcomputer 31 provides a signal to cause the indicator 25 to light up, giving an indication that the door lock/unlock system is in the super lock state for a predetermined period of time T4, for example 3 seconds. While the door lock/unlock system is in the ordinary lock position or in the super lock state, when the key cylinder 1 is operated to cause the key cylinder switch SW1 to take the unlock position C, the microcomputer 31 provides an unlock command signal (U/L) in the form of a pulse having the pulse duration T1 with which the door lock/unlock system is shifted back to the unlock state. In this instance, in the event where the lock/unlock system is shifted to the super lock state within a significantly short period of time from a shift to the ordinary lock state, there is a possibility that the super lock actuator 17 encounters an operation error. For this reason, there is provided an blanking time T2 following disappearance of an unlock command signal (U/L) having the pulse duration T1 for which an occurrence of another unlock command signal (U/L) is prohibited. Accordingly, there is always provided the blanking time T2 between each adjacent unlock command signals (U/L) even in the event where the key is repeatedly operated in an extremely short period of time. These times T1 and T2 are determined depending upon efficiency of the super lock actuator 17.

Figure 6:
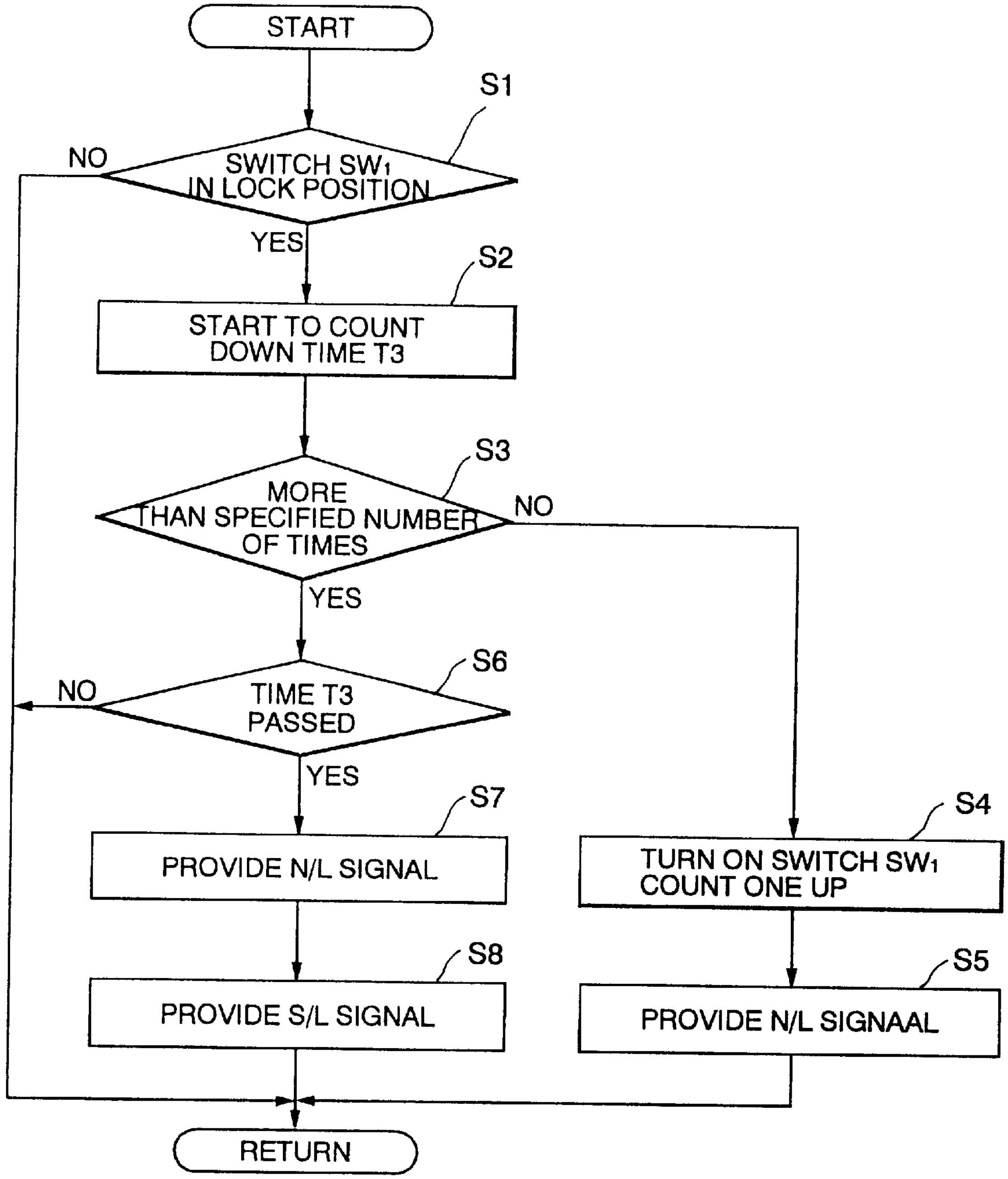
FIG. 6 is a flow chart illustrating a sequential routine of door lock/unlock control.

FIG. 6 is a flow chart schematically illustrating a general routine of the lock/unlock control for the door lock/unlock system according to an embodiment of the invention depicted in FIGS. 2–5.

When the flow chart logic commences and control proceeds directly to a function block at step S1 where a determination is made as to whether the key cylinder switch SW1 is in the lock position B. When the answer is "YES," i.e. it is in the lock position B, then, the timer start to count down the time T3 initially set at step S2. Subsequently, a determination is made at step S3 as to whether the key cylinder switch SW1 is repeatedly brought into the lock position B several times more than the specified number of times. Until the key cylinder switch SW1 is repeatedly brought into the lock position B the specified number of times, i.e. the answer is "NO," then, a counter for counting the number of movement to the lock position B of the key cylinder switch SW1 changes its count by a decrement of 1 (one) at step S4, and an ordinary lock signal (N/L) is provided at step S5 to shift the door lock/unlock system to the ordinary lock state.

On the other hand, the key cylinder switch SW1 is repeatedly brought into the lock position B several times greater than the specified number of times, i.e. the answer is "YES," then, another determination is subsequently made at step S6 as to whether the timer is still counting down or the time T3 has not yet passed. When the time Ts has not yet passed, i.e. the answer is "YES," an ordinary lock signal and a super lock signal are provided in order at steps S7 and S8, respectively, to shift the door lock/unlock system to the super lock state.

When key cylinder switch SW1 is out of the lock position B, i.e. the answer to the determination made at step S1 is "NO," or when the time T3 has passed, i.e. the answer to the determination made at step S6 is "NO," the flow chart logic orders return.

Figure 7:
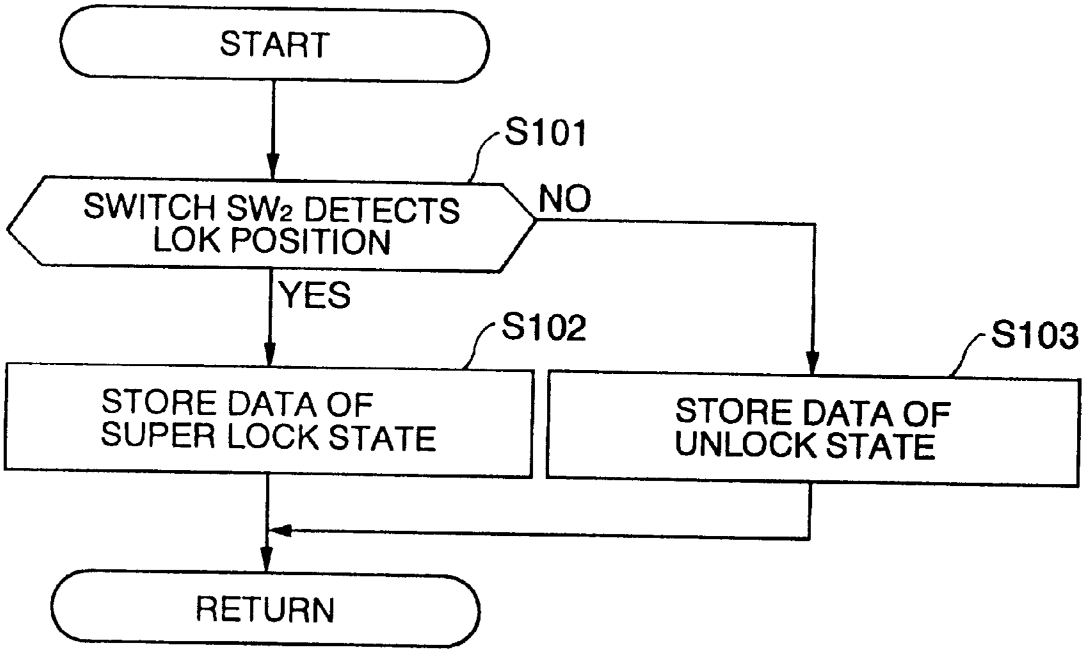
FIG. 7 is a flow chart illustrating another sequential routine of door lock/unlock control.

FIG. 7 is a flow chart schematically illustrating a general routine of the lock/unlock control for the door lock/unlock system according to another embodiment of the invention.

When the flow chart logic commences and control proceeds directly to a function block at step S101 where a determination is made as to whether the lock link lever switch SW2 linked with the locking mechanism of the driver's side door detects the lock position of the lock link lever 3. When the lock link lever switch SW2 detects the lock position of the lock link lever 3, i.e. the answer is "YES," the microcomputer 31 stores data representing that the door lock/unlock system is presently in the super lock state and causes the door lock/unlock system maintains the lock mechanisms for all other doors in the super lock state at step S102. In this state, even if the power source battery 35 is connected to the door lock/unlock control circuit with an intention of committing a theft of the vehicle, the door lock/unlock system is prevented from being released from the super lock state with an effect of protecting the vehicle against theft.

On the other hand, while the power source battery 35 is connected to the door lock/unlock control circuit, when the lock link lever switch SW2 detects the unlock position of the lock link lever 3, i.e. the answer is "NO," the microcomputer 31 stores data representing that the door lock/unlock system is presently in the unlock state and causes the door lock/unlock system causes the lock mechanisms for all other doors to shift to the unlock state from the super lock state at step S103, which makes it unnecessary for the driver to intentionally release lock mechanisms of the doors other than the driver's side door from the super lock state. As a result, there occurs no inconsistency in lock or unlock state among all of the doors of the vehicle, and hence improved convenience of the door lock/unlock system is ensured.

As described above, the door lock/unlock system is shifted to the super lock state only when operation of the key in the key cylinder 1 to the lock position B is consecutively repeated a predetermined number of times, for example two times, within the passage of the initial time T3, and hence prevented from shifting to the super lock state against a driver's intention. Counting time by the timer may start in response to a fall of an ordinary lock command signal (N/L).

While the door lock/unlock system may be structured so that it remains shifted to the super lock state even when the key is repeatedly operated any number of times greater than the predetermined number of times (two times in the preceding embodiment) as long as the repeated operation of the key is made within the initial time T3 to which the timer is set, conversely, it may be structured so as to return to the unlock state immediately when the key is repeatedly operated a number of times exceeding the predetermined number of times, for example three times in the preceding embodiment. In this case, if the door lock/unlock system is unintentionally shifted to the super lock state, it can be immediately released from the super lock state. Otherwise, the door lock/unlock system may provide a super lock signal (S/L) irrespective of the number of times of operation of the key in the event where the key is returned to the lock position B within a specified period of time from preceding operation of the key to the lock position B. Furthermore, the door lock/unlock system of the invention can be shifted to the super lock state by use of what is called a keyless control unit for remotely locking and unlocking the doors. In the case, the door lock/unlock system is structured to shift to the ordinary lock state in response to a single control signal provided by the keyless control unit and to the super lock state in response to a specified number of signals provided within a specified period of time by the keyless control unit.

In the case that the door lock/and unlock system is adapted and structured so as to make both the key for manually operating the key cylinder 1 and the keyless entry unit for remotely operating the door lock/and unlock system available to shift the door lock/and unlock system to the super lock state, the door lock/and unlock system significantly increases practical convenience.

Because the door lock/unlock system according to an embodiment shown and described above cooperates with the super lock unit 16 of the type comprising the disconnecting mechanism 18 which breaks off coordinated movement between the lock link lever 3 and the interior door lock knob 19 while the door lock/unlock system is in the super lock state, a locked state detection means is comprised of the lock link lever switch SW2 of the lock mechanism for the driver's side door. However, for a door lock/unlock system of a type having the interior door lock knob 19 fixed in its lock position while the door lock/unlock system remains shifted to the super lock state, a sensor may be incorporated to detect positions of the interior door lock knob 19 in place of the lock link lever switch SW2 as a locked state detection means.

It is to be understood that the present invention may be embodied with various changes, modifications and improvements, which may occur to those skilled in the art, without departing from the spirit and scope of the invention defined in the following claims.

What is claimed is:

1. A superlocking vehicle door lock/unlock system of a type having an electrically actuated door lock/unlock mechanism provided for each of a plurality of vehicle doors and actuation means for electrically actuating and switching each said door lock/unlock mechanism selectively into an unlock position in which said door lock/unlock mechanism unlocks a vehicle door in association with said door lock/unlock mechanism in response to specific operation of a door lock/unlock key, a lock position in which said door lock/unlock mechanism locks the vehicle door and from which said door lock/unlock mechanism is allowed to be switched to said unlock position by a release member disposed inside the vehicle body and a superlock position in which said door lock/unlock mechanism is prevented from being switched to said unlock position even with said release member said door lock/unlock system comprising:

a power source battery;

an electric circuit capable of being connected to said power source battery and supplied with electric power from said power source battery for operating electric components of the vehicle including said actuation means and said door lock/unlock mechanism;

position detecting means for detecting operated positions of said door lock/unlock mechanism when said electric circuit is brought into connection to said power source battery and control means for providing a control signal for controlling operation of said actuation means according to said operated positions of said door lock/unlock mechanism detected by said position detection means;

wherein, when said electric circuit is brought into connection with said power source battery, said control means provides a restraint signal with which said actuation means forces said door lock/unlock mechanisms for all of said vehicle doors to remain switched in said superlock position when said position detection means detects that said door lock/unlock mechanism in association with a specific one of said vehicle doors is in said lock position and provides an unlock signal with which said actuation means forces said door lock/unlock mechanisms for all of said vehicle doors to-be switched into said unlock position when said position detection means detects that said door lock/unlock mechanism in association with said specific vehicle door is in said unlock position.

2. A superlocking door lock/unlock system as defined in claim 1, wherein said specific operation of said door lock/unlock key comprises a specified number of times of locking operation of said door lock/unlock key within a specified period of time.

3. A door lock/unlock system as defined in claim 1, wherein said position detection means comprises a switch turning on and off according to positions of a lock link means forming part of said door lock/unlock mechanism which moves between two positions corresponding to said lock and unlock positions of said door lock/unlock mechanism.

4. A door lock/unlock system as defined in claim 1, wherein said position detection means comprises a position sensor for detecting positions of an interior door lock knob linked to said door lock/unlock mechanism.

5. A door lock/unlock system as defined in claim 1, wherein said specified door is a driver's side door.

6. A superlocking vehicle door lock/unlock system, which comprises:

an electrically actuated door lock/unlock mechanism provided for each of a plurality of vehicle doors, said door lock/unlock mechanism being switchable into an unlock position in which said door lock/unlock mechanism unlocks a door in association with said door lock/unlock mechanism in response to specific operation of a door lock/unlock key, a lock position in which said door lock/unlock mechanism locks said vehicle door and from which said door lock/unlock mechanism is allowed to be switched to said unlock position by a release member disposed inside the vehicle body and a superlock position in which said door lock/unlock mechanism is prevented from being switched to said unlock position even with said release member;

an actuator operative to electrically actuate and switch each said door lock/unlock mechanism selectively into said unlock, lock and superlock positions;

a power source battery;

an electric circuit capable of being connected to said power source battery and supplied with electric power from said power source battery for operating electric components of the vehicle including said actuator and said door lock/unlock mechanism;

a position detection sensor operative to detect operated positions of said door lock/unlock mechanism when said electric circuit is brought into connection to said power source battery; and a control unit operative to provide a control signal for controlling operation of said actuator according to said operated positions of said door lock/unlock mechanism detected by said position detection sensor;

wherein when said electric circuit is brought into connection to said power source battery, said control unit provides a restraining signal with which said actuator forces said door lock/unlock mechanisms for all of said vehicle doors to remain switched in said superlock position when said position detection sensor detects that said door lock/unlock mechanism in association with a specific one of said vehicle doors in said lock position and provides an unlock signal with which said actuator forces said door lock/unlock mechanisms for all of said vehicle doors to be switched into said unlock position when said position detection sensor detects that said door lock/unlock mechanism in association with said specific vehicle door is in said unlock position.

7. A superlocking door lock/unlock system as defined in claim 6, wherein said specific operation of said door lock/unlock key comprises a specified number of times of locking operation of said door lock/unlock key within a specified period of time.

* * * * *